(12) United States Patent
Ishida et al.

(10) Patent No.: US 10,914,010 B2
(45) Date of Patent: Feb. 9, 2021

(54) REFRIGERANT COMPRESSOR AND FREEZER INCLUDING SAME

(71) Applicant: Panasonic Intellectual Property Management Co., Ltd., Osaka (JP)

(72) Inventors: Yoshinori Ishida, Kyoto (JP); Shingo Oyagi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/462,110

(22) PCT Filed: Nov. 27, 2017

(86) PCT No.: PCT/JP2017/042360
§ 371 (c)(1),
(2) Date: May 17, 2019

(87) PCT Pub. No.: WO2018/097283
PCT Pub. Date: May 31, 2018

(65) Prior Publication Data
US 2019/0330747 A1    Oct. 31, 2019

(30) Foreign Application Priority Data
Nov. 28, 2016  (JP) .................................. 2016-230054

(51) Int. Cl.
*C23C 30/00*    (2006.01)
*F04B 39/02*    (2006.01)
(Continued)

(52) U.S. Cl.
CPC .............. *C23C 30/00* (2013.01); *F04B 39/02* (2013.01); *F16C 33/12* (2013.01); *F25B 1/02* (2013.01); *F05C 2201/0436* (2013.01)

(58) Field of Classification Search
CPC .......... C23C 30/00; F04B 39/02; F15C 33/12; F25B 1/02
See application file for complete search history.

(56) References Cited

U.S. PATENT DOCUMENTS 5,364,248 A   11/1994   Nakashima et al.
5,531,574 A    7/1996   Honma
(Continued)

FOREIGN PATENT DOCUMENTS

CN    1916419    2/2007
EP    0459778   12/1991
(Continued)

OTHER PUBLICATIONS

International Search Report of International Application No. PCT/JP2017/042360, dated Feb. 20, 2018, 5 pages.
(Continued)

*Primary Examiner* — F Daniel Lopez
*Assistant Examiner* — Daniel S Collins
(74) *Attorney, Agent, or Firm* — Hamre, Schumann, Mueller & Larson, P.C.

(57) ABSTRACT

A refrigerant compressor includes: an electric component; and a compression component driven by the electric component to compress a refrigerant. At least one sliding member constituting the compression component is made of a base material (185) that is an iron-based material. An abrasion resistance film (180) including a surface layer constituted by at least fine crystals is formed on a sliding surface of the sliding member. The surface layer (181) includes an A portion in which a component contained most is diiron trioxide ($Fe_2O_3$). The A portion exists within a range of at least 0.3 μm or less from an outermost surface of the sliding surface. The abrasion resistance film (180) may include at least one intermediate layer (182 to 184) located
(Continued)

between the surface layer (181) and the base material (185). With this, self-abrasion resistance of the sliding member can be improved, so that the refrigerant compressor having excellent reliability and efficiency can be obtained.

16 Claims, 4 Drawing Sheets

(51) Int. Cl.
*F16C 33/12* (2006.01)
*F25B 1/02* (2006.01)

(56) References Cited

U.S. PATENT DOCUMENTS

2009/0060403 A1    3/2009  Hamada et al.
2016/0017874 A1*   1/2016  Ishida ................ F04B 39/0005
                                                            417/415

FOREIGN PATENT DOCUMENTS

| | | |
|---|---|---|
| EP | 1605163 | 12/2005 |
| JP | H3-162559 | 7/1991 |
| JP | H5-271928 | 10/1993 |
| JP | H7-103140 | 4/1995 |
| JP | H7-238885 A | 9/1995 |
| JP | 2009-58016 | 3/2009 |
| WO | 2013/125197 A | 8/2013 |

OTHER PUBLICATIONS

Office Action and Search Report issued for corresponding Chinese patent application No. 201780072894.7, dated Feb. 7, 2020, 8 pages including English translation of Search Report.
Extended European Search Report in European patent application No. 17874828.1., dated Sep. 5, 2019, 7 pages.

* cited by examiner

REFRIGERANT COMPRESSOR AND FREEZER INCLUDING SAME

TECHNICAL FIELD

The present invention relates to a refrigerant compressor for use in refrigerators, air conditioners, and the like, and a freezer including the refrigerant compressor.

BACKGROUND ART

A sliding portion is constituted by combining a plurality of sliding members through sliding surfaces. Typically, when the type of a sliding operation is reciprocating sliding or rotational sliding, an abrasion resistance film is formed on the sliding surface of at least one of the sliding members constituting the sliding portion. Typical examples of the abrasion resistance film include a phosphate film, a gas nitriding film, and an iron oxide-based oxide film constituted by a triiron tetroxide ($Fe_3O_4$) monolayer. The oxide film constituted by the triiron tetroxide ($Fe_3O_4$) monolayer is typically formed by a blackening treatment (also called black oxide finish) method.

The abrasion resistance film covers the surface of the base material constituting the sliding member. The base material is typically metal, and at least a part of the surface of the base material is a sliding surface. When the sliding operation is performed at the sliding portion, lubricating oil is supplied to the sliding surfaces. Therefore, the abrasion of the sliding members is prevented or suppressed by the lubricating oil during the sliding operation, and an increase in sliding resistance by the contact between the metals (base materials) is suppressed. With this, the smooth sliding operation is secured at the sliding portion for a long period of time.

For example, PTL 1 discloses a refrigerant compressor including a sliding portion at which a phosphate film is used as the abrasion resistance film. According to this refrigerant compressor, in order to prevent the abrasion of the sliding portion, such as a piston or a crank shaft, for example, the phosphate film is formed on the sliding surface. By the formation of the phosphate film, depressions and projections on a machined surface subjected to machine finish are eliminated, and initial fitting between the sliding members can be made satisfactory.

For example, rotational motion is performed at a main shaft portion of the crank shaft and a bearing portion included in the refrigerant compressor. When the refrigerant compressor is in a stop state, the rotational speed is 0 m/s. When the refrigerant compressor starts up, the rotational motion starts from the metallic contact state. Therefore, large frictional resistance force acts. In this refrigerant compressor, the phosphate film is formed on the main shaft portion of the crank shaft, and the phosphate film has an initial fitting property. Therefore, abnormal abrasion by the metallic contact at the time of the start-up can be prevented by the phosphate film.

CITATION LIST

Patent Literature

PTL 1: Japanese Laid-Open Patent Application Publication No. 7-238885

SUMMARY OF INVENTION

Technical Problem

In recent years, in order to improve the efficiency of the refrigerant compressor, lower-viscosity lubricating oil is used, and a slide length of the sliding portion is designed to be shorter. Therefore, the conventional phosphate film disclosed in PTL 1 may quickly abrade or wear, and it may be difficult to maintain the fitting effect. With this, self-abrasion resistance of the phosphate film may deteriorate.

Further, in the refrigerant compressor, a load acting on the main shaft portion of the crank shaft while the crank shaft rotates once significantly fluctuates. In accordance with the load fluctuation, refrigerant gas dissolved in the lubricating oil vaporizes and generates bubbles between the crank shaft and the bearing portion in some cases. By this generation of the bubbles, the frequency of the break of the oil film and the occurrence of the metallic contact increases. As a result, the phosphate film formed on the main shaft portion of the crank shaft may quickly abrade, and a friction coefficient may increase.

Further, as an abrasion coefficient increases, heat generation of the sliding portion increases, and this may cause abnormal abrasion, such as adhesive wear. As the sliding portion, the refrigerant compressor includes a piston and a bore in addition to the main shaft portion of the crank shaft and the bearing portion. The same phenomenon as above may occur between the piston and the bore.

The present invention was made to solve the above problems, and an object of the present invention is to provide a refrigerant compressor which excels in reliability and efficiency by improving self-abrasion resistance of a sliding member, and a freezer including the refrigerant compressor.

Solution to Problem

To solve the above problems, a refrigerant compressor according to the present invention includes: an electric component; and a compression component driven by the electric component to compress a refrigerant. At least one sliding member constituting the compression component is made of a base material that is an iron-based material. An abrasion resistance film including a surface layer constituted by at least fine crystals is formed on a sliding surface of the sliding member. The surface layer includes an A portion in which a component contained most is diiron trioxide ($Fe_2O_3$). The A portion exists within a range of at least 0.3 µm or less from an outermost surface of the sliding surface.

According to the above configuration, both the improvement of the self-abrasion resistance of the sliding member and the suppression of the opponent attacking property of the sliding member are realized, and the adhesion between the base material and the oxide film can be improved. Therefore, the viscosity of the lubricating oil can be made lower, and the slide length of the sliding member constituting the sliding portion can be designed to be shorter. On this account, the sliding loss of the sliding portion can be reduced, and therefore, the excellent efficiency and performance of the refrigerant compressor can be realized, and the long-term reliability of the refrigerant compressor can be secured.

To solve the above problems, a freezer according to the present invention includes a refrigerant circuit including the above refrigerant compressor, a heat radiator, a decompressor, and a heat absorber, the refrigerant circuit being configured such that the refrigerant compressor, the heat radiator, the decompressor, and the heat absorber are annularly coupled to one another by pipes.

The above object, other objects, features, and advantages of the present invention will be made clear by the following detailed explanation of preferred embodiments with reference to the attached drawings.

Advantageous Effects of Invention

By the above configurations, the present invention can obtain effects of being able to provide a refrigerant compressor which excels in reliability and efficiency by improving self-abrasion resistance of a sliding member, and a freezer including the refrigerant compressor.

BRIEF DESCRIPTION OF DRAWINGS

FIGS. 3A to 3B are specific examples of a surface layer located on an outermost surface of the abrasion resistance film shown in FIG. 2A.

DESCRIPTION OF EMBODIMENTS

A refrigerant compressor according to the present disclosure includes: an electric component; and a compression component driven by the electric component to compress a refrigerant. At least one sliding member constituting the compression component is made of a base material that is an iron-based material. An abrasion resistance film including a surface layer constituted by at least fine crystals is formed on a sliding surface of the sliding member. The surface layer includes an A portion in which a component contained most is diiron trioxide ($Fe_2O_3$). The A portion exists within a range of at least 0.3 μm or less from an outermost surface of the sliding surface.

According to the above configuration, both the improvement of the self-abrasion resistance of the sliding member and the suppression of the opponent attacking property of the sliding member are realized, and the adhesion between the base material and the oxide film can be improved. Therefore, the viscosity of the lubricating oil can be made lower, and the slide length of the sliding member constituting the sliding portion can be designed to be shorter. On this account, the sliding loss of the sliding portion can be reduced, and therefore, the excellent efficiency and performance of the refrigerant compressor can be realized, and the long-term reliability of the refrigerant compressor can be secured.

The above refrigerant compressor may be configured such that: the abrasion resistance film includes at least one intermediate layer interposed between the surface layer and the base material; a component contained most in the intermediate layer is triiron tetroxide ($Fe_3O_4$); the intermediate layer contains a silicon (Si) compound; and the intermediate layer is a layer other than an iron oxide layer containing at least one of columnar structures and lamellar structures.

The above refrigerant compressor may be configured such that the intermediate layer is at least one of: a compound layer other than the iron oxide layer; and a mechanical strength improved layer formed on a surface of the base material.

The above refrigerant compressor may be configured such that: the compound layer is at least one selected from the group consisting of a carburized layer, a nitrided layer, and a black oxide finish layer; and the mechanical strength improved layer is at least one selected from the group consisting of a cold working layer, a work hardening layer, a solute strengthening layer, a precipitation strengthening layer, a dispersion strengthening layer, and a grain refining layer.

The above refrigerant compressor may be configured such that a crystal grain diameter of the surface layer falls within a range of 0.001 to 1 μm.

The above refrigerant compressor may be configured such that the surface layer is constituted by at least a surface-a layer and a surface-b layer which are different in crystal density from each other.

The above refrigerant compressor may be configured such that: the surface-a layer is located close to the outermost surface; the surface-b layer is located under the surface-a layer; and the crystal density of the surface-a layer is lower than the crystal density of the surface-b layer.

The above refrigerant compressor may be configured such that the surface-a layer contains vertically long needle structures each having an aspect ratio that falls within a range of 1 to 1000.

The above refrigerant compressor may be configured such that a film thickness of the abrasion resistance film falls within a range of 1 to 5 μm.

The above refrigerant compressor may be configured such that: the refrigerant is a HFC-based refrigerant, such as R134a, or a mixed refrigerant thereof; and the lubricating oil is ester oil, alkyl benzene oil, polyvinyl ether, polyalkylene glycol, or mixed oil thereof.

The above refrigerant compressor may be configured such that: the refrigerant is a natural refrigerant, such as R600a, R290, or R744, or a mixed refrigerant thereof and the lubricating oil is mineral oil, ester oil, alkyl benzene oil, polyvinyl ether, polyalkylene glycol, or mixed oil thereof.

The above refrigerant compressor may be configured such that: the refrigerant is a HFO-based refrigerant, such as R1234yf, or a mixed refrigerant thereof; and the lubricating oil is ester oil, alkyl benzene oil, polyvinyl ether, polyalkylene glycol, or mixed oil thereof.

The above refrigerant compressor may be configured such that: the refrigerant is a HFO-based refrigerant, such as R1234yf, or a mixed refrigerant thereof; and the lubricating oil is ester oil, alkyl benzene oil, polyvinyl ether, polyalkylene glycol, or mixed oil thereof.

The above refrigerant compressor may be configured such that the electric component is inverter-driven at a plurality of operation frequencies.

A refrigerant compressor according to the present disclosure includes a refrigerant circuit including the above refrigerant compressor, a heat radiator, a decompressor, and a heat absorber, the refrigerant circuit being configured such that the refrigerant compressor, the heat radiator, the decompressor, and the heat absorber are annularly coupled to one another by pipes.

Hereinafter, typical embodiments of the present invention will be explained with reference to the drawings. In the following explanation and the drawings, the same reference signs are used for the same or corresponding components, and a repetition of the same explanation is avoided.

Embodiment 1

Configuration of Refrigerant Compressor

Figure 1:
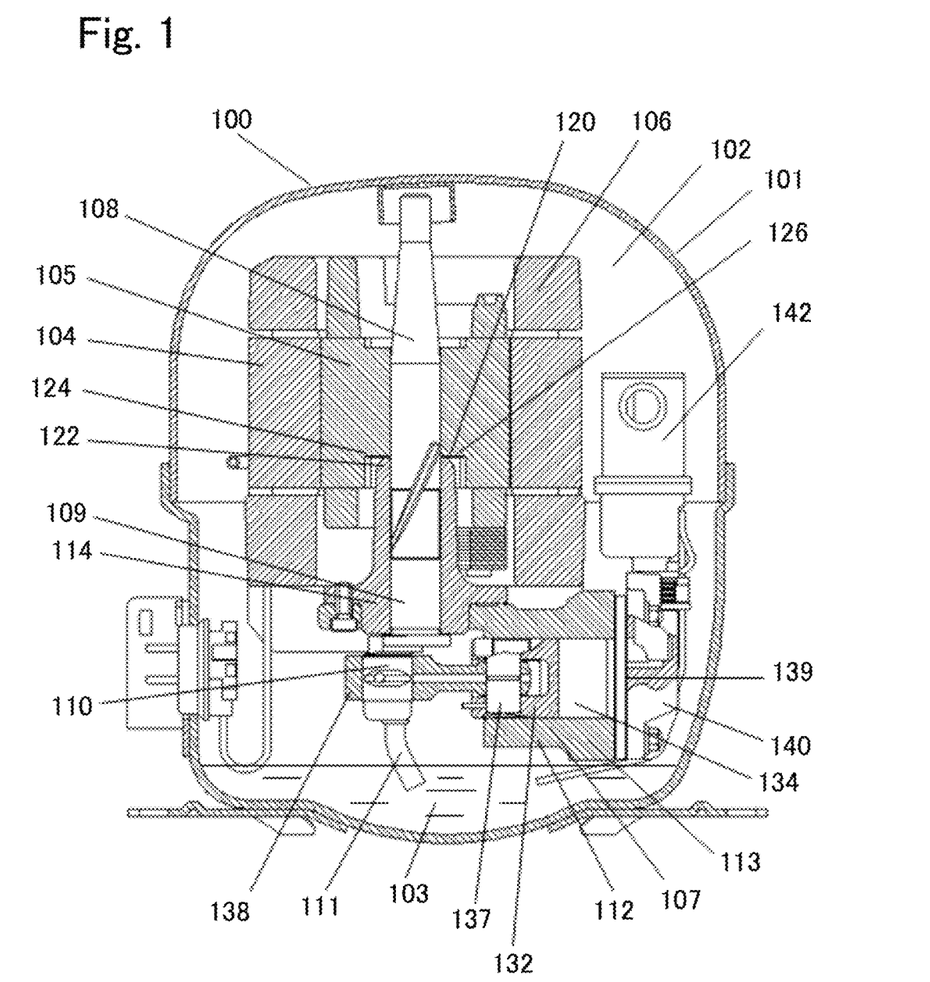
FIG. 1 is a schematic sectional view showing one example of the configuration of a refrigerant compressor according to an embodiment of the present disclosure.

First, a typical example of a refrigerant compressor according to Embodiment 1 will be specifically explained with reference to FIGS. 1 and 2A to 2D. FIG. 1 is a sectional view of a refrigerant compressor 100 according to Embodiment 1. FIGS. 2A to 2D are schematic sectional views showing specific configuration examples of an abrasion resistance film 180 formed at a sliding portion of the refrigerant compressor 100.

As shown in FIG. 1, in the refrigerant compressor 100, the sealed container 101 is filled with refrigerant gas 102 that is R134a, and ester oil as the lubricating oil 103 is stored in a bottom portion of the sealed container 101. The sealed container 101 accommodates an electric component 106 and a compression component 107. The electric component 106 is constituted by a stator 104 and a rotor 105, and the compression component 107 is a reciprocating type and is driven by the electric component 106.

The compression component 107 is constituted by a crank shaft 108, a cylinder block 112, a piston 132, and the like. The configuration of the compression component 107 will be explained below.

The crank shaft 108 is constituted by at least a main shaft portion 109 and an eccentric shaft 110. The main shaft portion 109 is press-fitted and fixed to the rotor 105. The eccentric shaft 110 is formed eccentrically with respect to the main shaft portion 109. An oil supply pump 111 communicating with the lubricating oil 103 is included at a lower end of the crank shaft 108.

In the crank shaft 108, an iron-based material is used as a base material 185, and the abrasion resistance film 180 is formed on the surface of the base material 185. Typical configuration examples of the abrasion resistance film 180 in Embodiment 1 are shown in FIGS. 2A to 2D. FIGS. 2A to 2D are schematic sectional views each showing one example of the configuration of the abrasion resistance film 180.

As shown in FIGS. 2A to 2D, the abrasion resistance film 180 in Embodiment 1 is only required to include a surface layer 181 on an outermost surface thereof. The surface layer 181 is constituted by at least fine crystals and includes an A portion in which a component contained most is diiron trioxide ($Fe_2O_3$). The A portion exists within a range of at least 0.3 µm or less from the outermost surface of a sliding surface (an outer surface of a sliding member constituting the sliding portion). Further, as shown in FIGS. 2A to 2D, one or more intermediate layers (182 to 184) are only required to be provided under the surface layer 181.

Figure 2A:
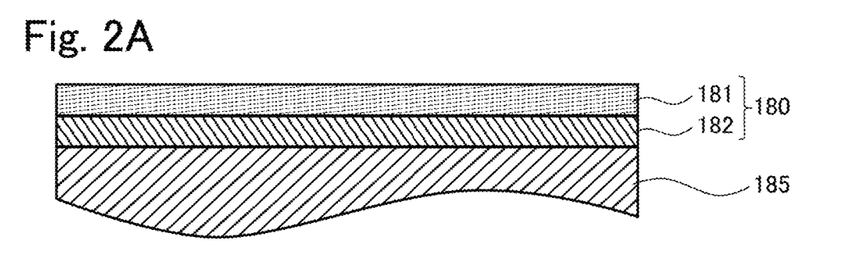
FIGS. 2A to 2D are schematic sectional views each showing one example of the configuration of an abrasion resistance film formed at a sliding portion included in the refrigerant compressor shown in FIG. 1.
Figure 2B:
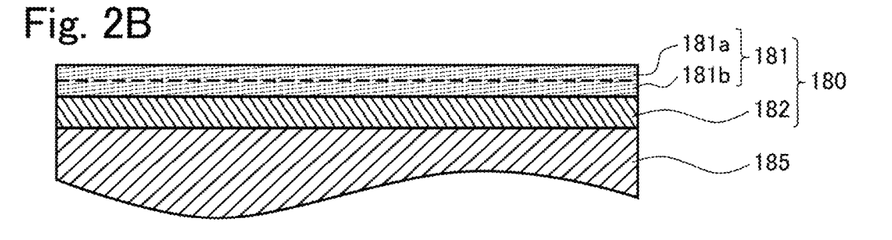

For example, as shown in FIGS. 2A and 2B, the intermediate layer 182 is interposed between the surface layer 181 of the abrasion resistance film 180 and the base material 185. In FIGS. 2A and 2B, a single layer (monolayer) is provided between the surface layer 181 and the base material 185, i.e., the intermediate layer 182 is provided between the surface layer 181 and the base material 185. However, as shown in FIGS. 2C and 2D, a plurality of intermediate layers (182 to 184) may be provided.

Figure 2C:
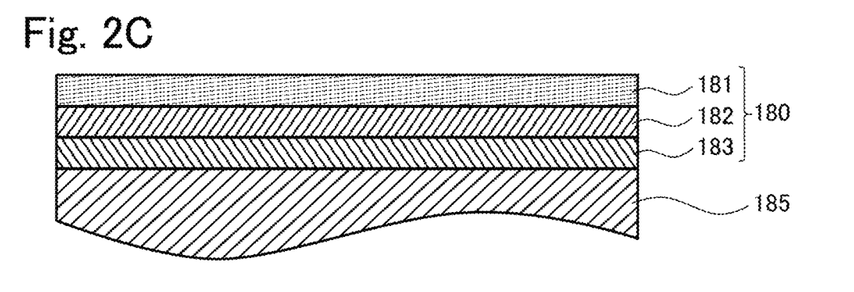
Figure 2D:
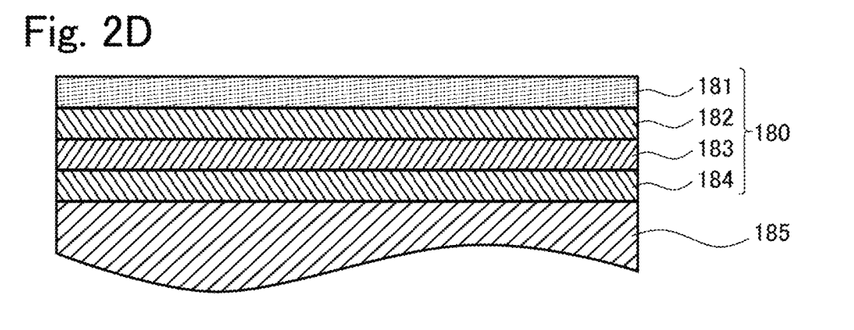

For example, in FIG. 2C, the two intermediate layers 182 and 183 are provided between the surface layer 181 and the base material 185. In FIG. 2D, the three intermediate layers 182 to 184 are provided between the surface layer 181 and the base material 185. Although not shown, four or more intermediate layers (182 to 184) may be provided between the surface layer 181 and the base material 185. Further, although not shown, the intermediate layers 182 to 184 may not be provided between the surface layer 181 and the base material 185. In other words, the surface layer 181 may be provided directly on the surface of the base material 185.

Specific configurations of the intermediate layers 182 to 184 are not especially limited. In the present disclosure, the intermediate layers 182 to 184 are only required to be layers other than an iron oxide layer. The iron oxide layer in the present disclosure is an iron oxide layer other than an iron oxide layer formed such that: a component contained most is triiron tetroxide ($Fe_3O_4$); a silicon (Si) compound is contained; and at least one of columnar structures and lamellar structures are contained. More specific configurations of the abrasion resistance film 180, the surface layer 181, and the intermediate layers 182 to 184 will be described later.

The cylinder block 112 is made of cast iron. The cylinder block 112 forms a substantially cylindrical bore 113 and includes a bearing portion 114 supporting the main shaft portion 109.

The rotor 105 includes a flange surface 120, and an upper end surface of the bearing portion 114 is a thrust surface 122. A thrust washer 124 is inserted between the flange surface 120 and the thrust surface 122 of the bearing portion 114. The flange surface 120, the thrust surface 122, and the thrust washer 124 constitute a thrust bearing 126.

The piston 132 is loosely fitted into the bore 113 with a certain amount of clearance and is made of an iron-based material. The piston 132 forms a compression chamber 134 together with the bore 113. The piston 132 is coupled to the eccentric shaft 110 by a connecting rod 138 as a coupler through a piston pin 137. An end surface of the bore 113 is sealed by a valve plate 139.

A head 140 forms a high pressure chamber. The head 140 is fixed to the valve plate 139 at an opposite side of the bore 113. A suction tube (not shown) is fixed to the sealed container 101 and connected to a low-pressure side (not shown) of a refrigeration cycle. The suction tube introduces the refrigerant gas 102 into the sealed container 101. A suction muffler 142 is sandwiched between the valve plate 139 and the head 140.

Operations of the refrigerant compressor 100 configured as above will be explained below.

Electric power supplied from a commercial power supply (not shown) is supplied to the electric component 106 and rotates the rotor 105 of the electric component 106. The rotor 105 rotates the crank shaft 108, and an eccentric motion of the eccentric shaft 110 is transmitted from the connecting rod 138 of the coupler through the piston pin 137 to drive the piston 132. The piston 132 reciprocates in the bore 113 to suck from the suction muffler 142 the refrigerant gas 102 introduced into the sealed container 101 through the suction tube (not shown) and compress the refrigerant gas 102 in the compression chamber 134.

In accordance with the rotation of the crank shaft 108, the lubricating oil 103 is supplied from the oil supply pump 111 to respective sliding portions to lubricate the sliding portions. In addition, the lubricating oil 103 serves as a seal between the piston 132 and the bore 113. It should be noted that the sliding portion denotes a portion where sliding surfaces of a plurality of sliding members contact and slide on each other.

In recent years, in order to further improve the efficiency of the refrigerant compressor 100, for example, (1) the lubricating oil 103 having lower viscosity is used, and (2) a slide length of each sliding member constituting the sliding portion (i.e., the slide length of the sliding portion) is designed to be shorter. Therefore, the slide condition is becoming severer. To be specific, the oil film of the sliding portion tends to be thinner, and it tends to be difficult to form the oil film of the sliding portion.

In addition, in the refrigerant compressor 100, the eccentric shaft 110 of the crank shaft 108 is formed eccentrically with respect to the bearing portion 114 of the cylinder block 112 and the main shaft portion 109 of the crank shaft 108. Therefore, by gas pressure of the compressed refrigerant gas 102, a fluctuating load that fluctuates is applied between the main shaft portion 109 of the crank shaft 108 and the connecting rod 138 of the eccentric shaft 110. In accordance with the load fluctuation, the refrigerant gas 102 dissolved in the lubricating oil 103 repeatedly vaporizes between, for example, the main shaft portion 109 and the bearing portion 114. Therefore, bubbles are generated in the lubricating oil 103.

Therefore, at the sliding portion, such as a portion between the main shaft portion 109 of the crank shaft 108 and the bearing portion 114, the oil film breaks, and the frequency of the metallic contact between the sliding surfaces increases.

However, the abrasion resistance film 180 including the above three layers is formed on the sliding portion of the refrigerant compressor 100, i.e., on the sliding portion of the crank shaft 108 as one example in Embodiment 1. Therefore, even if the frequency of the break of the oil film increases, the abrasion of the sliding surface can be suppressed for a long period of time.

In Embodiment 1, one example of the sliding member included in the refrigerant compressor 100 is the crank shaft 108. However, the sliding member is not limited to the crank shaft 108. The sliding members in the refrigerant compressor 100 configured as above may be the piston 132, the bore 113, and the connecting rod 138. In the present disclosure, the abrasion resistance film 180 is only required to be formed on the surface of such sliding member.

Configuration of Abrasion Resistance Film

Figure 3A:
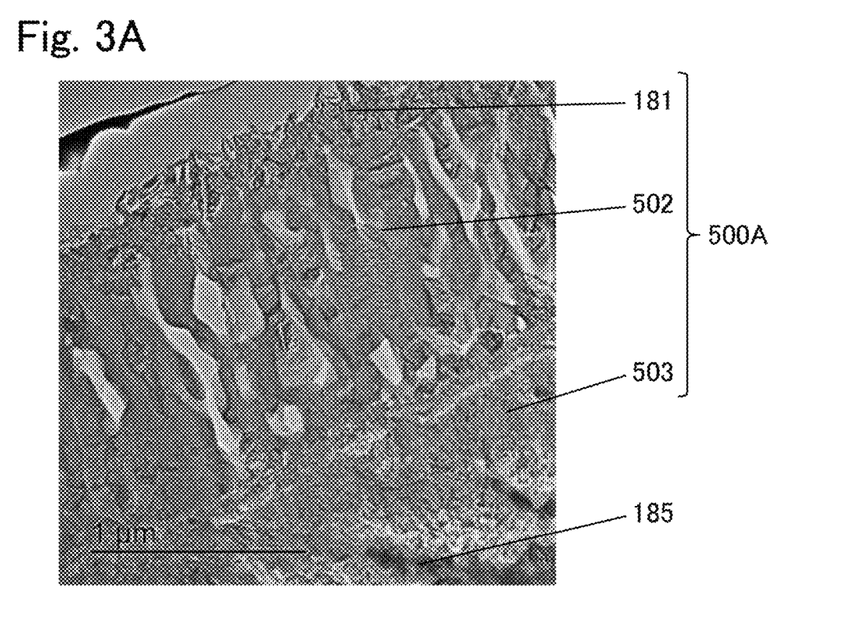
FIG. 3A is a TEM (transmission electron microscope) image showing one example of a result of a TEM observation of an oxide film formed at the sliding portion of the refrigerant compressor as a reference example.
Figure 3B:
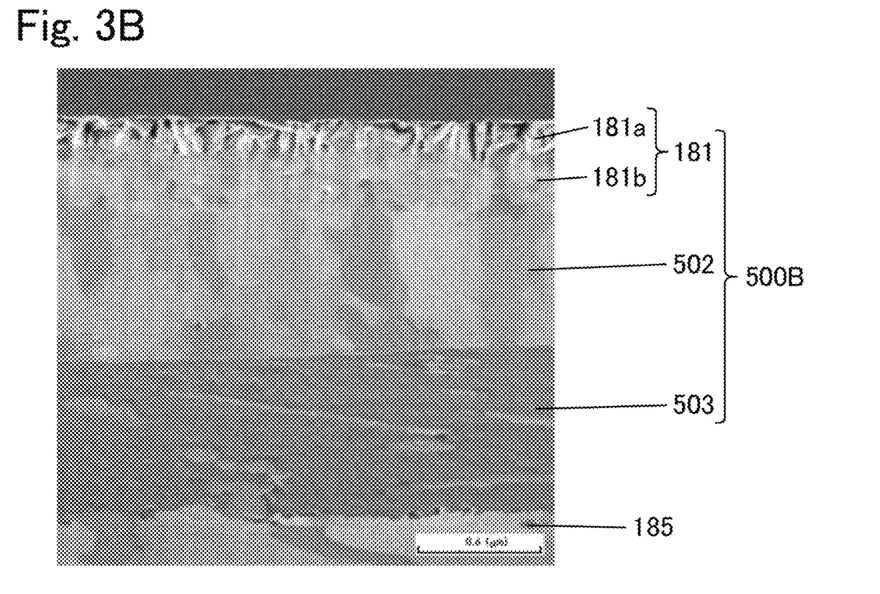
FIG. 3B is a SIM (scanning ion microscope) image showing one example of a result of a SIM observation of an oxide film formed at the sliding portion of the refrigerant compressor as a reference example.

Next, the abrasion resistance film 180 provided at the sliding member included in the refrigerant compressor 100 according to the present disclosure will be specifically explained with reference to FIGS. 3A and 3B in addition to FIGS. 2A to 2D. FIGS. 3A and 3B are microscopic images each showing a section of the oxide film as a reference example for showing the surface layer 181 of the abrasion resistance film 180. FIG. 3A is one example of a result of an observation of the oxide film including the surface layer 181 with a TEM (transmission electron microscope). FIG. 3B is one example of a result of a SIM (scanning ion microscope) observation of the oxide film including the surface layer 181.

As described above, as schematically shown in FIGS. 2A to 2D, the abrasion resistance film 180 is formed on the sliding surface of the sliding member in the present disclosure. The abrasion resistance film 180 includes: the surface layer 181 located on the outermost surface thereof; and the intermediate layer(s) (182 to 184) located between the surface layer 181 and the base material 185. At least one intermediate layer (182 to 184) is only required to be provided. To be specific, the number of intermediate layers (182 to 184) included in the abrasion resistance film 180 may be one (monolayer) or may be plural. Further, no intermediate layer (182 to 184) may be provided.

Therefore, in the present disclosure, the abrasion resistance film 180 is only required to include at least the surface layer 181. However, as shown in FIGS. 2A and 2B, the abrasion resistance film 180 may have a two-layer structure including the surface layer 181 and the intermediate layer 182. As shown in FIG. 2C, the abrasion resistance film 180 may have a three-layer structure including the surface layer 181 and the intermediate layers 182 and 183. As shown in FIG. 2D, the abrasion resistance film 180 may have a four-layer structure including the surface layer 181 and the intermediate layers 182 to 184. Although not shown, the abrasion resistance film 180 may have a five-layer structure or more, or the abrasion resistance film 180 may include a layer(s) other than the surface layer 181 and the intermediate layers 182 to 184.

The surface layer 181 is located on the outermost surface of the abrasion resistance film 180 and is constituted by at least fine crystals. Further, the surface layer 181 includes the above-described A portion (in which a component contained most is diiron trioxide ($Fe_2O_3$)). The position of the A portion is within a range of at least 0.3 μm or less from the outermost surface of the sliding surface. It should be noted that the range of the position of the A portion, i.e., the range of at least 0.3 μm or less from the outermost surface of the sliding member is referred to as an "outermost surface range" for convenience sake.

The A portion is only required to be a part which is contained in the surface layer 181 and located in the outermost surface range. The thickness of the A portion itself is not especially limited. The thickness of the A portion may be smaller than 0.3 μm that is the upper limit of the outermost surface range or may be larger than 0.3 μm. For example, when the thickness of the A portion is 0.1 μm or 0.2 μm, such thin A portion exists inside the outermost surface range (the range of 0.3 μm or less). When the thickness of the A portion is 0.5 μm or 0.7 μm, such thick A portion exists inside and outside the outermost surface range (the range of 0.3 μm or less) of the sliding member.

The thickness of the surface layer 181 is not especially limited and is only required to be set such that the function and action of the abrasion resistance film 180 according to the present disclosure can be adequately exhibited. The fine crystal constituting the surface layer 181 is only required to be a crystal having a grain diameter smaller than a grain diameter of a crystal structure contained in the intermediate layers 182 to 184 or a grain diameter of a crystal structure contained in the base material 185. Specifically, for example, the crystal structure of the surface layer 181 is only required to be a structure formed by spreading nano-level fine crystals.

The grain diameter of the fine crystal constituting the surface layer 181 is not especially limited and may fall within a range of 0.001 μm (1 nm) to 1 μm (1000 nm). A specific range of the grain diameter of the fine crystal can be set to a preferred range by suitably setting production conditions of the abrasion resistance film 180. One example of the surface layer 181 is the surface layer 181 included in a reference oxide film 500A shown in FIG. 3A as a reference example.

The reference oxide film 500A has a three-layer structure including the surface layer 181, a reference intermediate layer 502, and a reference intermediate layer 503 and is formed on the surface of the base material 185. Each of the reference intermediate layer 502 and the reference intermediate layer 503 corresponds to the iron oxide layer (in which: a component contained most is triiron tetroxide ($Fe_3O_4$); a silicon (Si) compound is contained; and at least one of columnar structures and lamellar structure are contained) which is excluded from the intermediate layers 182 to 184 in the present disclosure. As shown in FIG. 3A, for example, the surface layer 181 is constituted by structures formed by spreading fine crystals each having a grain diameter of 100 nm or less. The surface layer 181 in the present disclosure is only required to have the same configuration as above.

It should be noted that in the TEM image of the reference oxide film 500A in FIG. 3A, a layer is observed at an upper side of the surface layer 181. When observing with the TEM a sample (a part of the sliding member) on which the reference oxide film 500A is formed, a protective membrane (carbon deposited film) is formed on the reference oxide film 500A to protect the sample. In FIG. 3A, the layer observed at the upper side of the surface layer 181 is the protective membrane.

The surface layer 181 is constituted by the structures of the fine crystals. This does not mean that the surface layer 181 does not contain structures and the like other than the fine crystals. In the present disclosure, the surface layer 181 is substantially constituted by the fine crystals but may contain, for example, other structures as "impurities." Therefore, the surface layer 181 is only required to be constituted by at least the fine crystals, in other words, is only required to contain the fine crystals as major structures, and may contain other structures.

The surface layer 181 is constituted by at least the fine crystals. Slight voids are formed among the fine crystals, and/or minute depressions and projections are formed on the surface of the surface layer 181. Since such voids and/or such depressions and projections exist, the lubricating oil 103 can be held on the sliding surface, i.e., so called "oil holding property" can be exhibited even under a severe sliding condition. As a result, it is though that the oil film is easily formed on the sliding surface.

Since the surface layer 181 has a dense structure constituted by at least the fine crystals, the outermost surface of the abrasion resistance film 180 can exhibit satisfactory strength. Therefore, by the existence of the surface layer 181, the abrasion resistance film 180 can be configured to have the high "oil holding property" on the outermost surface and satisfactory strength. On this account, for example, even if the sliding member slides under a poor oil condition, the outermost surface has satisfactory strength, and the formation of the oil film on the sliding surface can be promoted. With this, the sliding member including the abrasion resistance film 180 can realize satisfactory self-abrasion resistance, and an attacking property (opponent attacking property) of the sliding member with respect to an opponent member can be made low.

As schematically shown in FIGS. 2A, 2C, and 2D and also shown in the reference oxide film 500A of FIG. 3A, the surface layer 181 of the present disclosure may be configured as a "single layer" as a whole. However, a specific configuration of the surface layer 181 is not limited to this. For example, as schematically shown in FIG. 2B and also shown in a reference oxide film 500B of FIG. 3B, the surface layer 181 may be constituted by at least a surface-a layer 181a and a surface-b layer 181b which are different in crystal density from each other.

As with the reference oxide film 500A, the reference oxide film 500B shown in FIG. 3B has a three-layer structure including the surface layer 181, the reference intermediate layer 502, and the reference intermediate layer 503 and is formed on the surface of the base material 185. As described above, each of the reference intermediate layer 502 and the reference intermediate layer 503 corresponds to the iron oxide layer which is excluded from the intermediate layers 182 to 184 in the present disclosure. As schematically shown in FIG. 2B, the surface layer 181 shown in FIG. 3B can be divided into the surface-a layer 181a and the surface-b layer 181b which are different in crystal density from each other.

As with the surface layer 181 schematically shown in FIGS. 2A, 2C, and 2D and also shown in the reference oxide film 500A of FIG. 3A, the surface layer 181 schematically shown in FIG. 2B and also shown in the reference oxide film 500B of FIG. 3B can be regarded as a "single layer" in that the surface layer 181 is substantially constituted by the fine crystals. However, for example, as shown in FIG. 3B, from the viewpoint of the density of the fine crystals, the surface layer 181 can be divided into the surface-a layer 181a located close to the outermost surface and the surface-b layer 181b located close to the base material 185 (reference intermediate layer 502). The surface-a layer 181a is lower in crystal density than the surface-b layer 181b located under the surface-a layer 181a.

Specifically, as shown in FIG. 3B, the surface-a layer 181a is constituted by at least the fine crystals and includes void portions (black portions in FIG. 3B) in some places. The surface-a layer 181a contains vertically long needle structures each having a minor-axis length of 100 nm or less and an aspect ratio within a range of 1 to 1000. On the other hand, the surface-b layer 181b located under the surface-a layer 181a hardly contains the void portions and the needle structures. The surface-b layer 181b contains the structures formed by spreading nano-level fine crystals.

As above, when the surface layer 181 of the abrasion resistance film 180 is constituted by the surface-a layer 181a and the surface-b layer 181b, the satisfactory strength and the satisfactory "oil holding property" can be exhibited as with the surface layer 181 (see FIGS. 2A and 3A) that is substantially the "single layer," and in addition, satisfactory peeling resistance can also be realized.

Since each of the surface-a layer 181a and the surface-b layer 181b constituting the surface layer 181 has a dense structure constituted by at least the fine crystals, the outermost surface of the abrasion resistance film 180 can exhibit satisfactory strength. Further, as with the surface layer 181 (see FIGS. 2A and 3A) that is substantially a "single layer," voids and/or depressions and projections exist among the fine crystals of the surface-a layer 181a. Especially, since the crystal density of the fine crystals of the surface-a layer 181a is low, the surface-a layer 181a includes void portions that are voids "wider" than the minute voids of the surface layer 181 that is substantially a "single layer." Therefore, even in a situation (poor oil situation) in which the lubricating oil 103 is unlikely to be supplied to the sliding portion, the lubricating oil 103 can be satisfactorily held on the sliding surface. As a result, the sliding member can exhibit the satisfactory "oil holding property."

The void portions which contribute to the "oil holding property" are generated in the surface-a layer 181a, and in addition, the surface-a layer 181a contains the needle structures. Since the needle structures are lower in hardness than the fine crystals, the needle structures show self-sacrificial abrasion on the sliding surface. As a result, the needle structures can promote the "fitting" with the sliding surface of the opponent member. Therefore, in the refrigerant compressor 100, the generation of static friction at the sliding portion is suppressed at the time of the start-up, so that stable low input can be realized at an early stage.

The surface-b layer 181b located under the surface-a layer 181a is higher in crystal density than the surface-a layer 181a. Therefore, the structures formed by spreading the fine crystals in the surface-b layer 181b are denser than those of the surface-a layer 181a, and therefore, mechanical strength of the surface-b layer 181b improves. As a result, the surface-a layer 181a which exhibits the satisfactory "oil holding property" is supported by the surface-b layer 181b having the high mechanical strength. Therefore, as a whole, the surface layer 181 can exhibit the satisfactory "oil holding property," and the peeling resistance of the surface layer 181 can be improved.

At least one intermediate layer (182 to 184) is formed under the surface layer 181 and is configured as a layer other than the iron oxide layer. In the reference oxide film 500A shown in FIG. 3A and the reference oxide film 500B shown in FIG. 3B, the iron oxide layer is provided as the "intermediate layer" (reference intermediate layers 502 and 503). However, in the present disclosure, each of the intermediate layers 182 to 184 is only required to be a layer other than the iron oxide layer. Specifically, for example, each of the intermediate layers 182 to 184 is only required to be at least one of a compound layer other than the iron oxide layer and a mechanical strength improved layer formed on the surface of the base material 185.

For example, the compound layer other than the iron oxide layer is at least one selected from the group consisting of a carburized layer, a nitrided layer, and a black oxide finish layer.

The carburized layer is formed by adding carbon to the surface of a material (i.e., by subjecting the surface of a material to a carburizing treatment) for the purpose of hardening the surface of the material. The carburizing treatment is a preparation for hardening the material, and the hardening itself is performed by quenching and tempering. Specific examples include gas carburizing, vacuum carburizing (vacuum gas carburizing), and plasma carburizing (ion carburizing) but are not especially limited. The thickness of the carburized layer is not especially limited but is generally 0.5 mm and about 2 mm at most.

The nitrided layer is formed by a treatment of impregnating a material with nitrogen. Typical examples of the treatment include gas nitriding and gas nitrocarburizing but are not especially limited. According to the gas nitriding, high-hardness nitrides are formed on the surface of the material, and with this, the surface of the material can be made harder than the carburized layer. The nitrided layer formed by the gas nitriding contains a compound (Fe—Al—N or Fe—Cr—N) obtained by combining iron and nitrogen with aluminum or chromium. According to the gas nitrocarburizing, the surface of the material is hardened by forming a compound layer ($Fe_3N$, $Fe_4N$) containing iron and nitrogen. The thickness of the nitrided layer is not especially limited and is about 0.1 to 0.3 mm according to the gas nitriding and 8 to 15 μm according to the gas nitrocarburizing.

As the black oxide finish layer, a black dense oxide film of triiron tetroxide ($Fe_3O_4$) is formed on the surface of a material by a blackening treatment (black oxide finish). The thickness of the black oxide finish layer is not especially limited and is about 0.2 to 1 μm.

For example, the mechanical strength improved layer is at least one selected from the group consisting of a cold working layer, a work hardening layer, a solute strengthening layer, a precipitation strengthening layer, a dispersion strengthening layer, a grain refining layer.

The cold working layer is formed by cold working at normal temperature or at less than a recrystallization temperature of a material.

The work hardening layer is formed such that: innumerable small spheres made of steel or nonferrous metal are made to collide with the surface of a material at high speed; and with this, work hardening by plastic deformation and compressive residual stress are given to the surface of the material.

The solute strengthening layer is formed by strengthening a material by the formation of a solid solution, and substitutional or interstitial solute atoms are introduced to the material.

The precipitation strengthening layer is formed by dispersing minute second-phase precipitates in a material mainly by an aging heat treatment.

The dispersion strengthening layer is formed by dispersing particles, such as oxides, in a material.

The grain refining layer is formed by making the sizes of reinforced crystal grains small.

The specific examples of the intermediate layers 182 to 184 in the abrasion resistance film 180 according to the present disclosure are not limited to the compound layer other than the iron oxide layer and the mechanical strength improved layer, and may include other known layers. When a plurality of intermediate layers (182 to 184) are formed between the surface layer 181 and the base material 185, these intermediate layers (182 to 184) may be the same in type as one another or may be different in type from one another. Or, when the number of intermediate layers (182 to 184) is three or more, some of the intermediate layers (182 to 184) may be the same in type as one another, and the other intermediate layers (182 to 184) may be different in type from one another.

As above, in the abrasion resistance film 180 according to the present disclosure, at least one intermediate layer (182 to 184) may be formed close to the base material 185. Each of the intermediate layers 182 to 184 is lower in hardness (softer) or higher in hardness (harder) than the fine crystals constituting the surface layer 181 depending on the type of the intermediate layer.

It is thought that if the intermediate layer (182 to 184) is soft, the intermediate layer serves as a "cushioning member" during the sliding operation. Therefore, it is thought that the fine crystals behave so as to be compressed toward the base material 185 by pressure applied to the surface during the sliding operation. As a result, it is thought that the opponent attacking property of the abrasion resistance film 180 becomes significantly lower than the opponent attacking property of other surface treatment film, and the abrasion of the sliding surface of the opponent member is effectively suppressed.

On the other hand, it is though that if the intermediate layer (182 to 184) is hard, the fine crystals are stably supported on the surface of the abrasion resistance film 180 by the stable intermediate layer (182 to 184) during the sliding operation. As a result, it is thought that the peeling resistance of the abrasion resistance film 180 can be made more satisfactory.

As a method of producing (forming) the abrasion resistance film 180, known methods capable of forming the surface layer 181 and the intermediate layers 182 to 184 can be suitably used, and the method of producing (forming) the abrasion resistance film 180 is not especially limited. For example, when the intermediate layer (182 to 184) is the above-described compound layer other than the iron oxide layer, the step of forming the compound layer is first executed, and the step of forming the surface layer 181 is then executed. Similarly, when the intermediate layer (182 to 184) is the above-described mechanical strength improved layer, the step of forming the mechanical strength improved layer on the surface of the base material 185 is first executed, and the step of forming the surface layer 181 is then executed.

Further, when one or more compound layers and one or more mechanical strength improved layers are included as the plurality of intermediate layers (182 to 184), the steps of forming the respective layers are first executed, and the step of forming the surface layer 181 is then executed. Or, although it depends on the types of the intermediate layers (182 to 184), the steps of forming the intermediate layer(s) (182 to 184) and the step of forming the surface layer 181 may be executed substantially simultaneously.

The method of forming the surface layer 181 is not especially limited, and production conditions and the like can be suitably set depending conditions, such as the type of the iron-based material that is the base material 185, the types of the intermediate layers 182 to 184 formed on the surface of the base material 185, and required physical properties of the abrasion resistance film 180. In the present disclosure, although it depends on the types of the intermediate layers 182 to 184 and the like, gray cast iron as the base material 185 is oxidized by using known oxidizing gas, such as carbon dioxide gas, and a known oxidation facility at several hundreds of degrees Celsius (for example, 400 to 800° C.). With this, the surface layer 181 can be formed on the surface of the base material 185.

Modified Example

As above, the refrigerant compressor 100 according to the present disclosure includes: the electric component 106; and the compression component 107 driven by the electric component 106 to compress a refrigerant. At least one sliding member constituting the compression component 107 is made of the base material 185 that is the iron-based material. The abrasion resistance film 180 including the surface layer 181 constituted by at least the fine crystals is formed on the sliding surface of the sliding member. The surface layer 181 includes the A portion in which a component contained most is diiron trioxide ($Fe_2O_3$). The A portion exists within a range (outermost surface range) of at least 0.3 µm or less from the outermost surface of the sliding surface.

With this, the self-abrasion resistance of the sliding member can be improved, and the opponent attacking property can be adequately suppressed. Therefore, highly-efficient design of the refrigerant compressor 100 (i.e., the design of lowering the viscosity of the lubricating oil 103 and shortening the slide length of the sliding portion) can be realized although it is difficult for the conventional surface treatment films to realize such design. As a result, according to the refrigerant compressor 100, the sliding loss of the sliding portion can be reduced, and therefore, high reliability and high efficiency can be realized.

The film thickness of the abrasion resistance film 180 is not especially limited, and the range of the film thickness of the abrasion resistance film 180 changes depending on the thickness of the surface layer 181, the thickness of the intermediate layer (182 to 184) provided under the surface layer 181, the number of intermediate layers (182 to 184) laminated, and the type of the intermediate layer (182 to 184). As described above, the surface layer 181 is only required to have the thickness substantially corresponding to the outermost surface range that is a range of 0.3 µm or less from the outermost surface of the abrasion resistance film 180.

If the range of the film thickness of the intermediate layer (182 to 184) is substantially the same as the range of the film thickness of the reference intermediate layer (502, 503) of the reference oxide film (500A, 500B), one example of the range of the typical film thickness of the abrasion resistance film 180 is a range of 1 to 5 µm. If the film thickness is less than 1 µm, it becomes difficult to keep the properties, such as the abrasion resistance, for a long period of time in some cases although it depends on conditions. In contrast, if the film thickness exceeds 5 µm, the surface roughness of the sliding surface becomes excessive although it depends on conditions. Therefore, it becomes difficult to manage the accuracy of the sliding portion constituted by a plurality of sliding members in some cases.

In Embodiment 1, the gray cast iron is used as the base material 185. However, the base material 185 is not limited to this. The base material 185 on which the abrasion resistance film 180 is formed is only required to be the iron-based material, and a specific configuration of the base material 185 is not especially limited. Typically, the cast iron is suitably used, but the base material 185 is not limited to this. The base material 185 may be a steel material, a sintered material, or other iron-based material. A specific type of the cast iron is not especially limited. As described above, the cast iron may be the gray cast iron (plain cast iron, FC cast iron), spherical graphite cast iron (FCD cast iron), or other cast iron.

Generally, the gray cast iron contains silicon at about 2%. However, the silicon content of the base material 185 is not especially limited. When the iron-based material contains silicon, the adhesion of the abrasion resistance film 180 improves in some cases. Generally, cast iron contains silicon at about 1 to 3%. Therefore, for example, spherical graphite cast iron (FCD cast iron) or the like can be used as the base material 185. Further, in many cases, the steel material and the sintered material do not substantially contain silicon, or the silicon content of each of the steel material and the sintered material is smaller than the silicon content of the cast iron. However, silicon may be added to the steel material or the sintered material at about 0.5 to 10%. With this, the same operational advantages as when the cast iron is used as the base material 185 can be obtained.

The state of the surface of the base material 185 on which the abrasion resistance film 180 is formed, i.e., the state of the sliding surface is not especially limited. Generally, as described above, the surface of the base material 185 is only required to be a polished surface. However, the surface of the base material 185 may be a non-polished surface depending on the type of the base material 185, the type of the sliding member, and/or the like. A known surface treatment may be performed before the oxidation treatment.

In Embodiment 1, R134a is used as the refrigerant. However, the type of the refrigerant is not limited to this. Similarly, in Embodiment 1, the ester oil is used as the lubricating oil 103. However, the type of the lubricating oil 103 is not limited to this. As the combination of the refrigerant and the lubricating oil 103, various known combinations can be suitably used.

Especially preferred examples of the combination of the refrigerant and the lubricating oil 103 are three combinations described below. By using such combinations, the excellent efficiency and excellent reliability of the refrigerant compressor 100 can be realized as with Embodiment 1.

In Combination 1, used as the refrigerant is R134a, a HFC-based refrigerant other than R134a, or a HFC-based mixed refrigerant, and used as the lubricating oil 103 is ester oil, alkyl benzene oil other than the ester oil, polyvinyl ether, polyalkylene glycol, or mixed oil thereof.

In Combination 2, used as the refrigerant is a natural refrigerant (such as R600a, R290, or R744) or a mixed refrigerant thereof, and used as the lubricating oil 103 is mineral oil, ester oil, alkyl benzene oil, polyvinyl ether, polyalkylene glycol, or mixed oil thereof.

In Combination 3, used as the refrigerant is an HFO-based refrigerant (such as R1234yf) or a mixed refrigerant thereof, and used as the lubricating oil 103 is ester oil, alkyl benzene oil, polyvinyl ether, polyalkylene glycol, or mixed oil thereof.

Especially, according to Combinations 2 and 3 among the above combinations, global warming can be suppressed by using the refrigerant having a low greenhouse effect. According to Combination 3, the above group of the examples as the lubricating oil 103 may include mineral oil.

In Embodiment 1, as described above, the refrigerant compressor 100 is a reciprocating type. However, the refrigerant compressor according to the present disclosure is not limited to the reciprocating type and may be other known type, such as a rotary type, a scroll type, or a vibration type. When the refrigerant compressor to which the present disclosure is applicable has a known configuration including the sliding portion, a discharge valve, and the like, the same operational advantages as Embodiment 1 can be obtained.

In Embodiment 1, the refrigerant compressor 100 is driven by a commercial power supply. However, the refrigerant compressor according to the present disclosure is not limited to this. For example, the refrigerant compressor may be inverter-driven at a plurality of operation frequencies. Even when the refrigerant compressor is configured as above, the formation of the above abrasion resistance film 180 on the sliding surface of the sliding portion included in the refrigerant compressor can realize both the improvement of the self-abrasion resistance of the sliding portion and the suppression of the opponent attacking property of the sliding portion. With this, the reliability of the refrigerant compressor can be improved even at the time of a low-speed operation in which the amount of oil supplied to each sliding portion is small and a high-speed operation in which a rotational frequency of the electric component increases.

Embodiment 2

Figure 4:
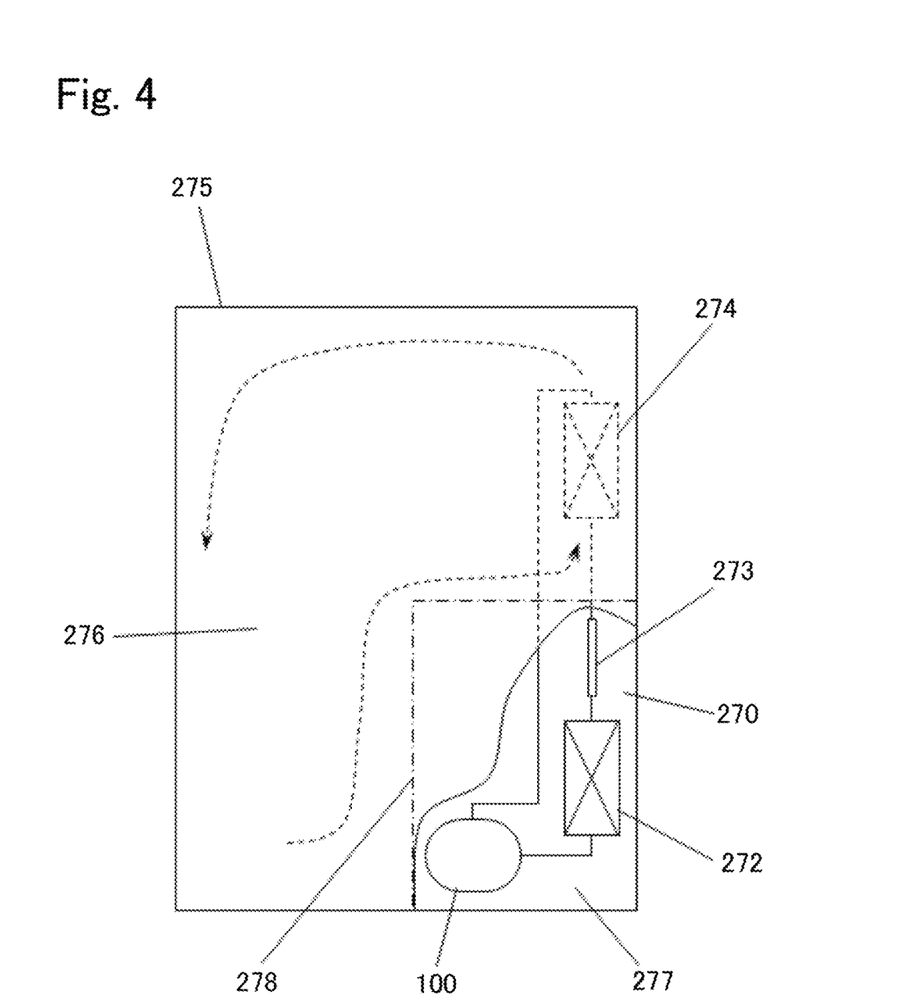
FIG. 4 is a schematic diagram showing one example of the configuration of a freezer including the refrigerant compressor shown in FIG. 1.

In Embodiment 2, one example of a freezer including the refrigerant compressor 100 explained in Embodiment 1 will be specifically explained with reference to FIG. 4. FIG. 4 schematically shows a schematic configuration of the freezer including the refrigerant compressor 100 according to Embodiment 1. Therefore, in Embodiment 2, only a basic configuration of the freezer will be explained.

As shown in FIG. 4, the freezer according to Embodiment 2 includes a main body 275, a partition wall 278, a refrigerant circuit 270, and the like. The main body 275 is constituted by a heat-insulation box body, a door body, and the like. The box body includes an opening on one surface thereof, and the door body opens and closes the opening of the box body. The inside of the main body 275 is divided by the partition wall 278 into a storage space 276 for articles and a machine room 277. A blower (not shown) is provided in the storage space 276. It should be noted that the inside of the main body 275 may be divided into, for example, spaces other than the storage space 276 and the machine room 277.

The refrigerant circuit 270 is configured to cool the inside of the storage space 276 and includes, for example, the refrigerant compressor 100 explained in Embodiment 1, a heat radiator 272, a decompressor 273, and a heat absorber 274. The refrigerant compressor 100, the heat radiator 272, the decompressor 273, and the heat absorber 274 are annularly connected to one another by pipes. The heat absorber 274 is arranged inside the storage space 276. As shown by broken line arrows in FIG. 4, cooling heat of the heat absorber 274 is stirred by the blower (not shown) so as to circulate in the storage space 276. With this, the inside of the storage space 276 is cooled.

As explained in Embodiment 1, the refrigerant compressor 100 included in the refrigerant circuit 270 includes the sliding member, such as the crank shaft 108, and the abrasion resistance film 180 is formed on the sliding surface of the sliding member.

As above, the freezer according to Embodiment 2 includes the refrigerant compressor 100 according to Embodiment 1. The sliding portion included in the refrigerant compressor 100 excels in abrasion resistance and adhesion to the sliding surface. Therefore, the sliding loss of the sliding portion can be reduced, and the refrigerant compressor 100 can realize excellent reliability and excellent efficiency. As a result, the freezer according to Embodiment 2 can reduce the power consumption, and therefore, energy saving can be realized, and the reliability can also be improved.

The present invention is not limited to the above described embodiments and may be changed in various ways within the scope of the claims, and embodiments obtained by suitably combining technical means disclosed in different embodiments and/or plural modified examples are included in the technical scope of the present invention.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the scope of the present invention.

INDUSTRIAL APPLICABILITY

As above, the present invention can provide a refrigerant compressor which excels in reliability while using low-viscosity lubricating oil, and a freezer including the refrigerant compressor. Therefore, the present invention is widely applicable to various apparatuses using a refrigeration cycle.

REFERENCE SIGNS LIST 100 refrigerant compressor
108 crank shaft (sliding member)
113 bore (sliding member)
132 piston (sliding member)
138 connecting rod (sliding member)
180 abrasion resistance film
181 surface layer
181$a$ surface-a layer
181$b$ surface-b layer
182 intermediate layer
183 intermediate layer
184 intermediate layer
185 base material
270 refrigerant circuit
272 heat radiator
273 decompressor
274 heat absorber

The invention claimed is:

1. A refrigerant compressor comprising:
an electric component; and
a compression component driven by the electric component to compress a refrigerant, wherein:
at least one sliding member constituting the compression component is made of a base material that is an iron-based material;
an abrasion resistance film including a surface layer constituted by at least fine crystals is formed on a sliding surface of the sliding member;
the surface layer includes an A portion in which a component contained most is diiron trioxide ($Fe_2O_3$);
the A portion exists within a range of at least 0.3 μm or less from an outermost surface of the sliding surface, and
the surface layer is constituted by at least a surface-a layer and a surface-b layer that are different in crystal density from each other.

2. The refrigerant compressor according to claim 1, wherein:
the abrasion resistance film includes at least one intermediate layer interposed between the surface layer and the base material;
a component contained most in the intermediate layer is triiron tetroxide ($Fe_3O_4$);
the intermediate layer contains a silicon (Si) compound; and
the intermediate layer is a layer other than an iron oxide layer containing at least one of columnar structures and lamellar structures.

3. The refrigerant compressor according to claim 2, wherein the intermediate layer is at least one of: a compound layer other than the iron oxide layer; and a mechanical strength improved layer formed on a surface of the base material.

4. The refrigerant compressor according to claim 3, wherein:
the compound layer is at least one selected from the group consisting of a carburized layer, a nitrided layer, and a black oxide finish layer; and
the mechanical strength improved layer is at least one selected from the group consisting of a cold working layer, a work hardening layer, a solute strengthening layer, a precipitation strengthening layer, a dispersion strengthening layer, and a grain refining layer.

5. The refrigerant compressor according to claim 1, wherein a crystal grain diameter of the surface layer falls within a range of 0.001 to 1 μm.

6. The refrigerant compressor according to claim 1, wherein:
the surface-a layer is located close to the outermost surface;
the surface-b layer is located under the surface-a layer; and
the crystal density of the surface-a layer is lower than the crystal density of the surface-b layer.

7. The refrigerant compressor according to claim 1, wherein the surface-a layer contains vertically long needle structures each having an aspect ratio that falls within a range of 1 to 1000.

8. The refrigerant compressor according to claim 1, wherein a film thickness of the abrasion resistance film falls within a range of 1 to 5 μm.

9. The refrigerant compressor according to claim 1, wherein:
the refrigerant is a HFC-based refrigerant, or a mixed refrigerant thereof; and
the refrigerant compressor further comprises a lubricating oil selected from ester oil, alkyl benzene oil, polyvinyl ether, polyalkylene glycol, and a mixed oil thereof.

10. The refrigerant compressor according to claim 9, wherein the refrigerant comprises R134a.

11. The refrigerant compressor according to claim 1, wherein:
the refrigerant is a natural refrigerant, or a mixed refrigerant thereof; and
the refrigerant compressor further comprises a lubricating oil selected from mineral oil, ester oil, alkyl benzene oil, polyvinyl ether, polyalkylene glycol, and a mixed oil thereof.

12. The refrigerant compressor according to claim 11, wherein the refrigerant comprises at least one selected from R600a, R290, R744, and mixtures thereof.

13. The refrigerant compressor according to claim 1, wherein:
the refrigerant is a HFO-based refrigerant, or a mixed refrigerant thereof; and
the refrigerant compressor further comprises a lubricating oil selected from ester oil, alkyl benzene oil, polyvinyl ether, polyalkylene glycol, and a mixed oil thereof.

14. The refrigerant compressor according to claim 13, wherein the refrigerant comprises R1234yf.

15. The refrigerant compressor according to claim 1, wherein the electric component is inverter-driven at a plurality of operation frequencies.

16. A freezer comprising a refrigerant circuit including the refrigerant compressor according to claim 1, a heat radiator, a decompressor, and a heat absorber, the refrigerant circuit being configured such that the refrigerant compressor, the heat radiator, the decompressor, and the heat absorber are annularly coupled to one another by pipes.

* * * * *